Patented Aug. 6, 1929.

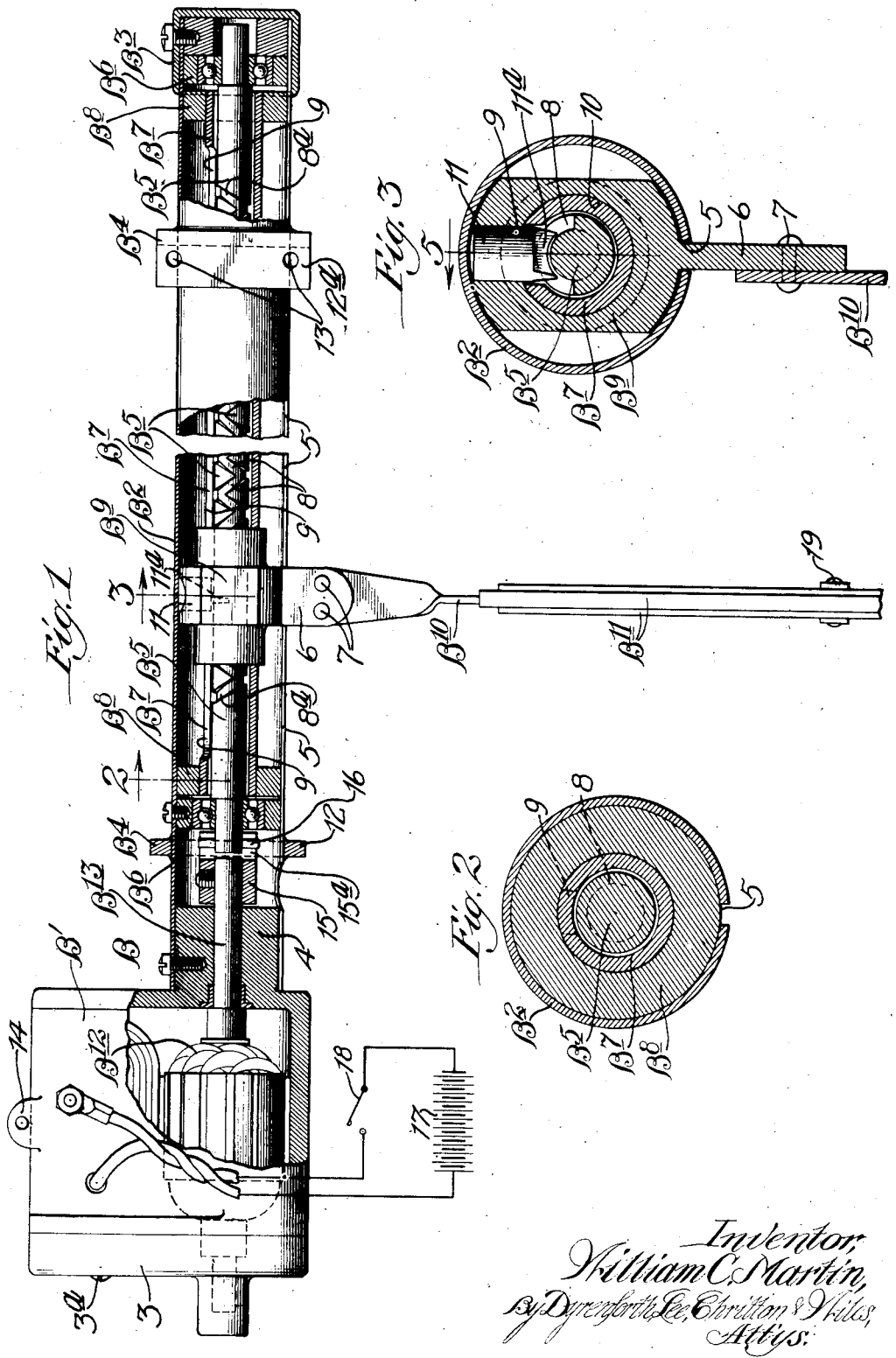

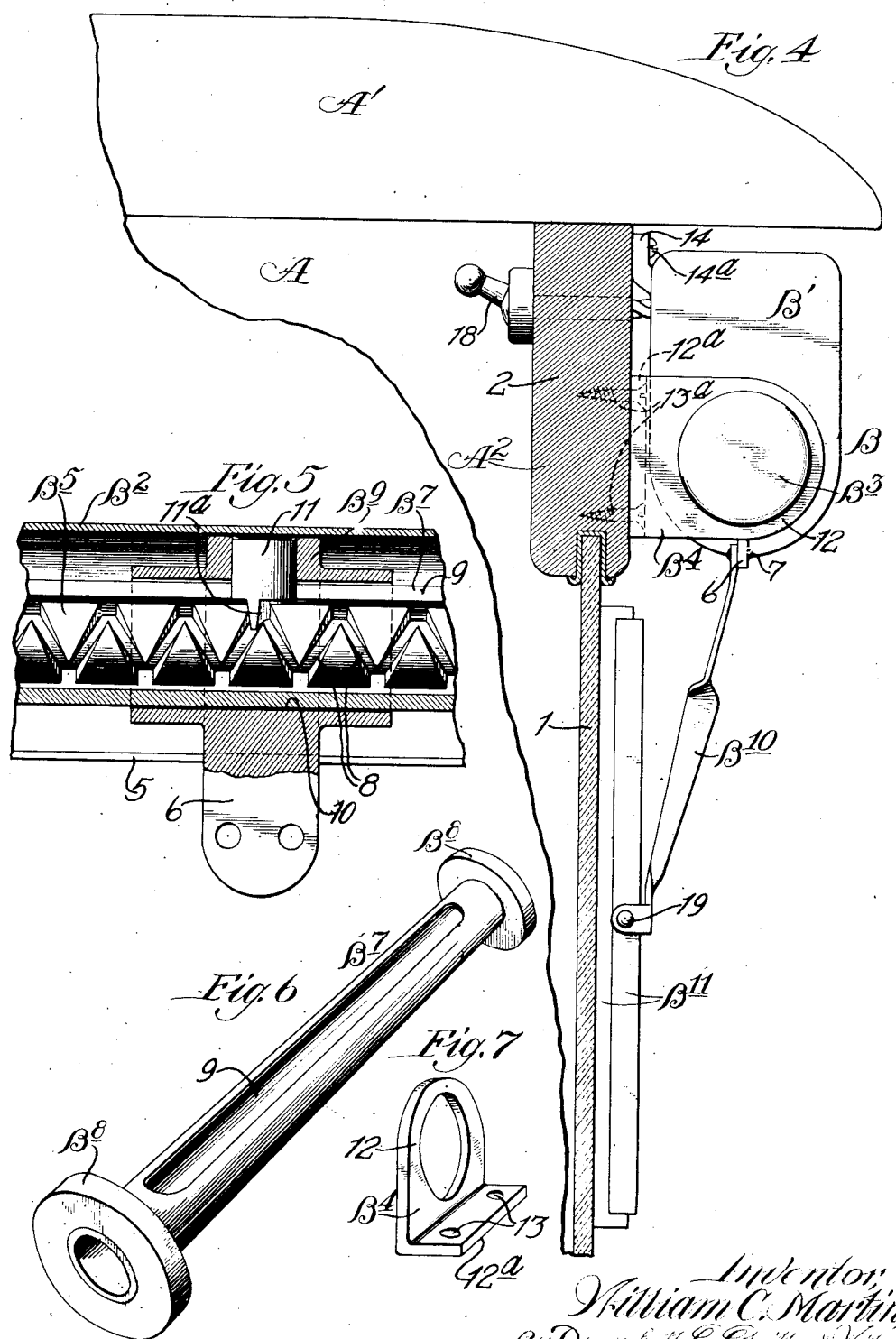

1,723,189

UNITED STATES PATENT OFFICE.

WILLIAM C. MARTIN, OF MILWAUKEE, WISCONSIN, ASSIGNOR OF ONE-FOURTH TO JOHN H. LEE, OF OAK PARK, ILLINOIS.

WIND-SHIELD CLEANER.

Application filed June 6, 1927. Serial No. 196,769.

This invention relates particularly to windshield cleaners of the type employing a wiper adapted to travel back and forth longitudinally across the windshield so as to give clear vision throughout the length of the windshield.

The primary object is to provide a simple, electrically operated device of this character which can be manufactured at moderate cost.

The invention is illustrated in a preferred embodiment in the accompanying drawing, in which—

Fig. 1 is a broken elevational view, partly in section, of a windshield cleaner embodying the invention, the view being from the rear of the device; Fig. 2, a transverse section taken as indicated at line 2 of Fig. 1; Fig. 3, a broken transverse section taken as indicated at line 3 of Fig. 1; Fig. 4, a broken sectional view of an automobile body, the improved device being applied to the windshield thereof; Fig. 5, a broken longitudinal sectional view on an enlarged scale, illustrating the connection between the actuating screw-shaft and the reciprocating slide which carries the wiper; Fig. 6, a view of an inner slotted sleeve which houses the screw and serves to prevent vibration thereof; and Fig. 7, a perspective view of one of the bracket-rings employed for attaching the elongated housing of the device to the windshield frame.

In the illustration given, A designates an automobile body having a top A' and a windshield $A^2$; and B designates the improved windshield cleaner.

The device B comprises, in the form illustrated, a motor-casing B'; an elongated housing $B^2$ connected at one end with the motor-casing and equipped at the other end with a removable cap $B^3$; a pair of ring-brackets $B^4$, $B^4$ which serve as a means for attaching the elongated housing to the windshield frame; a screw-shaft $B^5$ journalled in bearings $B^6$, $B^6$ with which the elongated housing is fitted internally; an internal guide-tube $B^7$ having its ends mounted in internal rings $B^8$ secured within the housing $B^2$; a slide $B^9$ adapted to be reciprocated by the screw-shaft; a depending arm $B^{10}$ fixedly secured to the slide and equipped with a wiping element $B^{11}$; and an electric motor $B^{12}$ housed in the casing B' and provided with an armature shaft $B^{13}$ which is in alignment with and coupled to the screw-shaft $B^5$.

The automobile body A may be of any desired construction, as is true, also, of the windshield. In the illustration, the windshield $A^2$ comprises a glass 1 having its upper margin secured in a cross-bar 2 located beneath the top A'.

The motor-casing B' is a hollow body preferably formed with integral walls on all sides, excepting one end, where a removable end-cap 3 is employed to close the casing, this cap being secured to the body of the casing by screws $3^a$.

The other end of the casing preferably is provided with a tubular boss 4 upon which is pivoted the adjacent end of the elongated tubular housing $B^2$. The housing $B^2$ is provided at its lower side with a longitudinal slot 5 in which works a depending lug 6 with which the slide $B^9$ is equipped. The arm $B^{10}$ is fixedly secured to the lug 6 by means of rivets 7. The elongated housing $B^2$ may be formed of sheet-metal curved into tubular form; or it may consist of a slotted similar tubing. Preferably it is of brass.

The screw-shaft $B^5$ is provided with right and left thread-grooves 8 which cross each other, and which are united at their ends with reversing grooves $8^a$. The bearings $B^6$ for the screw-shaft are preferably anti-friction bearings.

The rings $B^8$ are fitted within the housing $B^2$ between the bearings $B^6$; and the ends of the tubular guide $B^7$ are supported in said rings. The tubular guide $B^7$ preferably consists of a heavy gauge copper tube which is cut away at its upper side, or provided at its upper side with an elongated slot 9.

The slide $B^9$ is in the form of a cast-metal member which fits freely within the tubular housing $B^2$ and which is provided with a central bore 10 through which the inner tubular guide $B^7$ extends freely. In other words, the slide $B^9$ is adapted to be reciprocated on the tubular guide $B^7$. In the upper portion of the slide $B^9$ is a swiveled member 11 having a depending screw-engaging blade $11^a$ which depends through the slot 9 of the inner guide tube and engages the thread-groove of the screw-shaft. It will be understood that the thread-engaging member reverses so as to cause the slide to move back and forth, like a nut, notwithstanding the fact that the screw-shaft rotates always in one direction.

The bracket-rings $B^4$ are shown (see Fig. 7) as formed from heavy sheet-metal. Thus, each member has a ring-portion 12 which embraces the tubular housing $B^2$ and a base portion $12^a$ provided with perforations 13 which receive the attaching screws $13^a$ which serve to secure the device to the cross-member 2 of the automobile body. If desired, the motor-casing $B'$ is equipped with attaching lugs 14 (one shown), secured to the member 2 by means of a screw $14^a$. Ordinarily, however, it is sufficient to support the housing $B^2$ and support the motor-casing through the medium of the housing.

The armature-shaft $B^{13}$ is shown journalled in the bearings with which the motor-casing is provided. One end of the armature-shaft projects through the bearing afforded by the lug 4 and is equipped with a rigidly secured tubular coupling member 15 which is provided with a slot $15^a$ engaged by a transverse pin 16 carried by the adjacent end of the screw-shaft $B^5$. Thus, the armature of the motor is direct-coupled to the screw-shaft. It will be understood that the spiral grooves 8 of the screw-shaft are given the requisite pitch to cause the wiper to be reciprocated, or carried back and forth across the full length of the windshield, at the desired speed.

The motor is driven by electricity from a suitable source, such as a battery 17, the circuit being equipped with a switch 18 applied to the cross-bar $A^2$ within convenient reach of the driver.

The wiper-element $B^{11}$ is shown connected with the wiper-arm $B^{10}$ by means of a pivotal connection 19. It will be understood that the wiper-arm is guided in its movements by the slot 5, and that the wiper-arm ordinarily is made sufficiently resilient to hold the wiper-element properly against the glass.

The inner tubular guide-member $B^7$, which preferably is of copper, serves to prevent undue vibration of the screw-shaft, and also provided, preferably, an additional bearing for the slide $B^9$. Thus, there is provided a staunch and durable construction, free from vibration and noise.

From the description given, it will be understood that current may be admitted through the switch 18 to the electric motor which will operate to turn the screw-shaft $B^5$ continuously in one direction. The screw-shaft will, by reason of its engagement with the blade $11^a$ of the reversible member 11, cause the slide-block $B^9$ to move backwardly and forwardly from one end of the housing to the other, thus moving the wiper $B^{11}$ back and forth across the windshield longitudinally thereof.

The improved device is of simple construction, and is so designed as to enable the parts to be cheaply manufactured and assembled at very small cost. The device is well adapted to its purpose, and may be caused to operate by simply turning on the current through the medium of the switch 18.

In practice, the motor will ordinarily be located at the lateral edge of the windshield which is nearest the driver.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A device of the character set forth, comprising an elongated housing provided at its lower side with a slot, an inner guide-tube disposed centrally within said housing and having its ends supported in said housing, said guide-tube being provided at its upper side with a longitudinal slot, a tubular slide through which said guide-tube extends freely, a reversible thread-engaging member swivelled in the upper portion of said slide and working through the slot with which said guide-tube is provided, a screw-shaft extending freely through said guide-tube and provided with intersecting right and left thread-grooves, a motor-casing secured to one end of said housing, and an electric motor journalled in said casing and direct-coupled to said screw-shaft.

2. A device of the character set forth, comprising an elongated tubular housing fitted at one end with a closure, said housing being provided at its lower side with a guide-slot, an inner guide-tube supported at its ends in centered position within said tubular housing and provided at its upper side with a slot, a slide on said guide-tube and within said tubular housing, a reversible thread-engaging member mounted in said slide and working through the slot in said guide-tube, a screw-shaft journalled in said housing and extending freely through said guide-tube and provided with intersecting right and left thread-grooves.

WILLIAM C. MARTIN.